United States Patent Office 2,801,245
Patented July 30, 1957

---

2,801,245

PROCESS FOR THIAMINE PURIFICATION

Jerome J. Lawson, Gladstone, N. J., assignor to American Cyanamid Company, New York, N. Y., a corporation of Maine No Drawing. Application December 10, 1956,
Serial No. 627,102

8 Claims. (Cl. 260—256.6)

This invention relates to a process for the purification of thiamine mononitrate.

Various forms of vitamin $B_1$, or thiamine, have been used in the past. A new form, thiamine mononitrate, has recently achieved prominence for particular purposes and, because of its unique stability, is of special value for food enrichment and multi-vitamin preparations.

As is customary with products intended for human consumption, thiamine mononitrate must be in a highly purified form. However, the purification of this new and useful form of thiamine is very difficult. The ordinary methods useful for the purification of other forms of thiamine are not satisfactory here; for example recrystallization from hot water fails to remove certain impurities. Such recrystallization is especially difficult to carry out on a large scale since, in aqueous solution, the product is not completely stable at the necessary high temperatures. Furthermore, an alkaline precipitation of this mononitrate from acidic solutions similarly does not remove all impurities. Because of its low solubility in organic solvents such as ethanol, a recrystallization process from such solvents is also not feasible. Previous laboratory methods in the literature have, in face, used this low solubility to permit the extraction of the impurities from the product. However, the use of water as a solvent for large scale preparations is always to be preferred to alcohol for economic and safety reasons.

I have now found that extremely pure thiamine mononitrate is obtained by dissolving the crude material in warm dilute aqueous nitric acid, filtering to remove insoluble impurities, increasing the pH by the addition of an alkalizing agent where necessary, and separating the resulting precipitated thiamine mononitrate from the soluble impurities by filtration. There is obtained an extremely pure product in high yield, with little handling being required, the impurities being removed in an economical operation. It is furthermore possible to recycle the mother liquor for use in the purification of additional amounts or as the make-up liquor for crude mononitrate preparation with resultant saving of material.

It is surprising that this nitric acid process will produce material of such high purity. In ordinary purification processes, the impurities often dissolve along with the thiamine mononitrate and precipitate with the product resulting in coloration of the product or inclusion of difficultly soluble material. However, in my process, by the proper selection of the amount of nitric acid and the pH conditions, etc., a large portion of the impurities does not dissolve and is removed by a simple filtration. Furthermore, the impurities which do go into solution remain in solution when the product is precipitated at the higher pH and lower temperature at which the thiamine nitrate is quite insoluble. Thus, by careful control of conditions, high recoveries of extremely pure product are possible.

Thiamine mononitrate is obtained commercially by a process involving the oxidation of 3(4-amino-2-methyl-6-pyrimidylmethyl)4-methyl-5-(2-hydroxyethyl)thiazolthione-2 (hereinafter referred to as "the thiazolthione intermediate") in nitric acid with hydrogen peroxide. The reaction is illustrated by the equation:

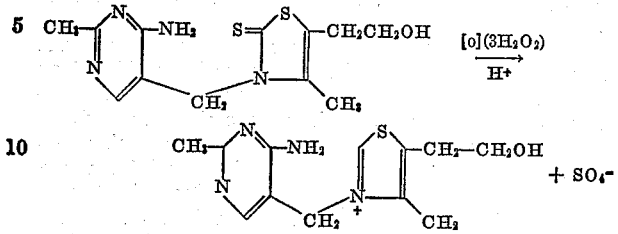

It is the impurities resulting from the by-products of this oxidation as well as unreacted starting material which my invention is primarily designed to eliminate.

In the practice of my invention, the impure thiamine mononitrate is added to dilute aqueous nitric acid and the mixture is warmed to effect solution. After removal of insoluble impurities, usually by filtration, a sufficient amount of a basic reagent may be added to increase the pH of the solution, or if the pH of dissolution is high enough, simple cooling will suffice for the isolation. The purified product which precipitates is then isolated by conventional methods. In practice the impure thiamine mononitrate can be separated directly from the thiazolthione intermediate oxidation reaction mixture by the process of my invention. The excess peroxide is destroyed with sulfurous acid and the insoluble impurities are removed by filtration of the warm reaction mixture. Alternatively, the product can be isolated in an impure form by basification without an attempt at purification and this crude product can then be put through the process of my invention.

Generally, the impure thiamine mononitrate is added to sufficient dilute nitric acid to form a complete solution at about 50 to 70° C. The concentration of the nitric acid may vary from about 0.13 to 0.7 normal. The amount and strength of acid are chosen so that a pH of from about 4.0 to 5.0 results. The amount of nitric acid which is used is somewhat critical since it is desired to dissolve just the product; excess nitric acid tends to dissolve more of the impurities. When nitric acid of strength in the upper part of the range is used, the volume of the solvent needed is less. While purification of some degree is obtainable by the use of other volumes, for the best results with acid of the preferred strength, it is found preferable to use from 4 to 8 milliliters of dilute acid per gram of thiamine nitrate. The purity suffers when lower volumes of dilute acid are used since some of the impurities then precipitate with the product during isolation. The range which is most preferred is 5 to 6 milliliters of dilute nitric acid per gram of thiamine nitrate. It is also possible to dissolve the product at lower temperatures or even room temperature by using larger volumes of dilute nitric acid than a ratio of 8 milliliters to one gram of thiamine nitrate but more of the impurities dissolve and the recovery of thiamine nitrate is too low to be economical.

The mixture is then warmed to about 50–75° C., since at this temperature a minimum of nitric acid may be used to prevent undue loss of thiamine mononitrate in the mother liquors because of solubility, while still dissolving all the thiamine nitrate. At higher temperatures, more of the impurities start to dissolve, and also, decomposition of the thiamine mononitrate becomes appreciable. The solution is filtered hot to remove the insoluble impurities. Again the elevated temperature is used to keep the thiamine in solution in the least amount of acid. Temperatures of the order of 65–70° C. are preferred for the clarification, but lower temperatures are effective if the thiamine nitrate will stay in solution in the amount of nitric acid being used. Temperatures above 50° C., in general, should be used. The separation is usually done by ordinary filtration, but it will be obvious to anyone skilled in the art that equivalent manipulations, such as centrifuging or otherwise forcing the mixture through a barrier porous to the liquid but not to the solids, will be equally usable and the word "filter" is intended to cover such equivalents.

As the basic reagent to increase the pH when required, any soluble carbonate, bicarbonate or hydroxide of an alkali or an alkaline earth metal, or ammonium or quaternary ammonium hydroxides or carbonates such as sodium, potassium, calcium, barium or ammonium hydroxide, ammonium sodium, potassium or lithium carbonate, ammonium, sodium or potassium bicarbonate and the like may be used. I prefer, however, to use sodium carbonate or sodium bicarbonate. The pH of the solution for the final precipitation may be from about 4.5 to about 7.5, but to achieve the best results, I prefer not to exceed a pH of about 5.5 to 6.5. Much of the product usually precipitates upon the addition of the agent even though the pH of the mixture may not have risen above about 4.5 or a pH above 4.5 has been used to dissolve. This may be due to a buffering action. Although, I do not wish to be limited to any theory thereon, it is sufficient to note that I can achieve substantial recovery even at these low pH values and where a pH above 4.5 has been used to dissolve, it may not be necessary to add any basification reagent, in order to achieve an economic recovery.

It is also more economical to cool the solution before the final isolation of the product since the solubility is lower at the lower temperature. The lower the temperature the better the recovery. However, good recoveries are obtained even if the final filtration is carried out at temperatures up to about 45° C.

During the purification, if the nitric acid solutions of pH lower than 4.5 are allowed to cool before increasing the pH by the addition of alkaline reagent, a crystalline substance sometimes separates which is the nitrate-nitric acid salt (dinitrate). However, this offers no difficulty since it redissolves when the solution is reheated and the pH is increased and on recooling, only the mononitrate precipitates.

It is an advantage of my invention that it provides a simple effective aqueous method of preparing thiamine mononitrate of high purity in good yields. Such a combination of advantages has not previously been available. Aqueous methods in the past have given poor recovery or poor quality or both while the alcoholic or aqueous alcohol laboratory methods were not adaptable to large scale manufacturing for reasons of handling or cost.

This invention is further illustrated by the examples which follow, in which parts are by weight unless otherwise specified.

Example 1

To 1500 parts of 0.4 N nitric acid is added 300 parts of crude thiamine mononitrate and the mixture is warmed to 60–70° C. There is then added 29 parts of activated charcoal and after holding the mixture at about 70° C., the solution is clarified by filtration and the residue is washed with 200 parts of hot 0.4 N nitric acid.

To the combined filtrate and washings is added sufficient concentrated aqueous sodium carbonate solution to produce a pH of 5.6 to 5.8. The product starts to precipitate and after the precipitation is completed at a temperature of about 50° C., the precipitated solid product is separated by filtration. After washing the solid product with anhydrous ethanol and drying at 50° C., the purified thiamine mononitrate is obtained in excellent recovery.

Sodium bicarbonate, potassium carbonate, or calcium or ammonium hydroxide solutions can be substituted for the sodium carbonate solution used above, to obtain equivalent results.

Example 2

The procedure of Example 1 is followed except that 1520 parts of 0.21 N nitric acid are used in the place of the 1500 parts of 0.4 N acid. A good recovery of pure thiamine mononitrate results.

Example 3

The procedure of Example 1 is used with the following variations in the amounts and concentrations of the dilute nitric acid used and the indicated temperatures of clarification. Good yields of good quality thiamine nitrate are produced in each case.

| Parts of Acid | Normality of Acid | pH of Solution | Temperature of Clarification, °C. |
| --- | --- | --- | --- |
| 1,540 | 0.38 | 4.3 | 60 |
| 1,530 | 0.35 | 4.3 | 67–70 |
| 1,530 | 0.45 | 4.5 | 50–53 |
| 1,730 | 0.35 | 4.3 | 65–70 |
| 1,250 | 0.55 | 4.2 | 60–65 |
| 2,400 | 0.13 | 4.9 | 60–65 |

I claim:

1. The process of purifying thiamine mononitrate from impurities resulting from the oxidation of 3(4-amino-2-methyl - 6 - pyrimidylmethyl) - 4 - methyl - 5 - (2 - hydroxyethyl)thiazolthione-2 which comprises heating a mixture of said thiamine mononitrate in from 4 to 8 milliliters of 0.13 to 0.7 normal nitric acid per gram of thiamine mononitrate to a temperature above 50° C. but not over 75° C., filtering from said hot mixture undissolved impurities, and precipitating purified thiamine mononitrate at a pH between 4.5 and 7.5.

2. The process of claim 1 in which the removal of insoluble impurities is carried out between 50 and 75° C., and the filtrate is cooled below 45° C. before isolating the product.

3. The process of claim 2 in which nitric acid of a normality of 0.35 to 0.45 is used, in a ratio of 5 to 6 milliliters per gram of thiamine mononitrate being dissolved.

4. The process of claim 3 in which the initial heating of the mixture is to a temperature 65 to 70° C. and the clarification is carried out when the mixture is within this range.

5. The process of claim 4 in which the basification is sufficient to produce a pH between 5.5 and 6.5 in the filtrate, before the isolation of the product.

6. The process of claim 5 in which the basification is carried out with the carbonate of an alkali metal.

7. The process of claim 5 in which the basification is carried out with sodium carbonate.

8. The process of claim 1 in which the purification is carried out on the crude reaction mixture from the oxidation of sulfone with hydrogen peroxide from nitric acid solution.

No references cited.